United States Patent
Thomasson

(10) Patent No.: US 6,963,642 B1
(45) Date of Patent: *Nov. 8, 2005

(54) BAND-BY-BAND FULL DUPLEX COMMUNICATION

(75) Inventor: Samuel L. Thomasson, Gilbert, AZ (US)

(73) Assignee: Acoustic Technology, Inc., Mesa, AZ (US)

(*) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/476,468

(22) Filed: Dec. 30, 1999

(51) Int. Cl.⁷ .............................................. H04M 1/00
(52) U.S. Cl. ........................ 379/406.04; 379/406.03; 379/406.01
(58) Field of Search .................... 379/406, 410, 379/202, 388, 387, 406.07, 406.11, 406.14, 379/406.01, 406.03, 406.04; 370/288

(56) References Cited

U.S. PATENT DOCUMENTS

| | | | |
|---|---|---|---|
| RE28,919 E | * 7/1976 | Berkley et al. ............. | 379/406 |
| 4,748,663 A | 5/1988 | Phillips et al. ............. | 379/388 |
| 4,991,167 A | * 2/1991 | Petri et al. .................. | 370/288 |
| 5,271,057 A | 12/1993 | Addeo et al. ............... | 379/202 |
| 5,561,668 A | * 10/1996 | Genter .................. | 379/406.07 |
| 5,668,794 A | * 9/1997 | McCaslin et al. ...... | 379/406.07 |
| 6,798,881 B2 | * 9/2004 | Thomasson ............ | 379/406.07 |

OTHER PUBLICATIONS

*Encyclopedia of Electronic Circuits*, Rudolf F. Graf, vol. 3, pp. 391-397, © 1991 McGraw-Hill, Inc.

* cited by examiner

Primary Examiner—Jefferey F. Harold
(74) Attorney, Agent, or Firm—Paul F. Wille

(57) ABSTRACT

A telephone includes a first channel having a microphone input and a line output, a second channel having a line input and a speaker output, and each channel having a plurality of band pass filters with their outputs coupled to a multiplex circuit. The multiplex circuit selects subsets of the signals in each channel in accordance with the magnitudes of the signals in each band. Thus, full duplex operation is provided in accordance with the spectral content of each channel. In one embodiment of the invention, the multiplex circuits initially allocate alternate bands within each channel and complementary bands between the channels, thereby emulating a complementary comb filter. Thereafter, bands are allocated according to spectral content.

10 Claims, 4 Drawing Sheets

US 6,963,642 B1

BAND-BY-BAND FULL DUPLEX COMMUNICATION

BACKGROUND OF THE INVENTION

This invention relates to telephone systems and, in particular, to providing full duplex operation for more than two parties to a telephone call. As used herein, "telephone" includes cellular telephones.

There are two kinds of echo in a telephone system, an acoustic-echo between an earphone or a speaker and a microphone and an electrical echo occurring in the switched network for routing a call between stations. In a handset, acoustic echo is typically not much of a problem. In speaker phones, where several people huddle around a microphone and loudspeaker, acoustic feedback is much more of a problem. Hybrid circuits (two-wire to four-wire transformers) located at terminal exchanges or in remote subscriber stages of a fixed network are the principal sources of electrical echo, also known as line echo.

Filtering a voice signal to eliminate either or both kinds of echo is known in the art. Devices known as complementary comb filters have been used to eliminate echoes by having the signal to a speaker filtered through the pass bands of a first comb filter, thereby falling within the stop bands of a second, complementary comb filter coupled to a microphone. Matching, rather than complementary, comb filters can be used in the line out and line in channels of a telephone if one also uses a frequency shift; see U.S. Pat. No. 4,748,663 (Phillips et al.). Frequency shifting is undesirable because of the effect on the quality of the voice signal.

Complementary filters work well when there are only two parties to a call. For a conference call, at least one of the phones must be in half-duplex mode. Switching unobtrusively between half duplex and full duplex among the parties is difficult at best and invariably one of the parties is blocked momentarily while speaking.

One could provide three complementary comb filters (each containing one pass band and two stop bands) for a three party call but the cost of such a system is prohibitive. Further, the reduction in spectral power would significantly reduce the quality of the audio signal.

Even with well designed band pass filters, a comb filter necessarily reduces the power and spectral content of speech. For example, an amplitude peak may happen to fall within the stop band of a comb filter, substantially changing the sound characteristic of a person's voice. When fricatives fall within a stop band, intelligibility can be significantly reduced. Amplification is not a cure if the filters do not match the spectral response of an person's voice.

In other applications, e.g. automotive cellular telephones, certain sounds are noises characteristic of the vehicle or environment rather than the driver and it would be desirable to have a stop band match the dominant frequency of the noise. Again, comb filters of the prior art cannot remove such noise except by chance.

In view of the foregoing, it is therefore an object of the invention to provide an improved band pass filter system in which each band is chosen individually depending upon the spectral content of the applied signal.

Another object of the invention is to provide a band pass filter system in which full duplex communication is optimized for the voice characteristics of the respective speakers.

A further object of the invention is to provide a band pass filter system in which the pass bands can be allocated among three parties in a phone call.

Another object of the invention is to provide a band pass filter system that can emulate a comb filter initially and then adapt to the spectral content of each channel.

SUMMARY OF THE INVENTION

The foregoing objects are achieved in this invention in which a telephone includes a first channel having a microphone input and a line output, a second channel having a line input and a speaker output, and each channel has a plurality of band pass filters with their outputs coupled to a multiplex circuit. The multiplex circuit selects subsets of the signals in each channel in accordance with the magnitudes of the signals in each band. Thus, full duplex operation is provided in accordance with the spectral content of each channel. In one embodiment of the invention, the multiplex circuits initially allocate alternate bands within each channel and complementary bands between the channels, thereby emulating a complementary comb filter. Thereafter, bands are allocated according to spectral content.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
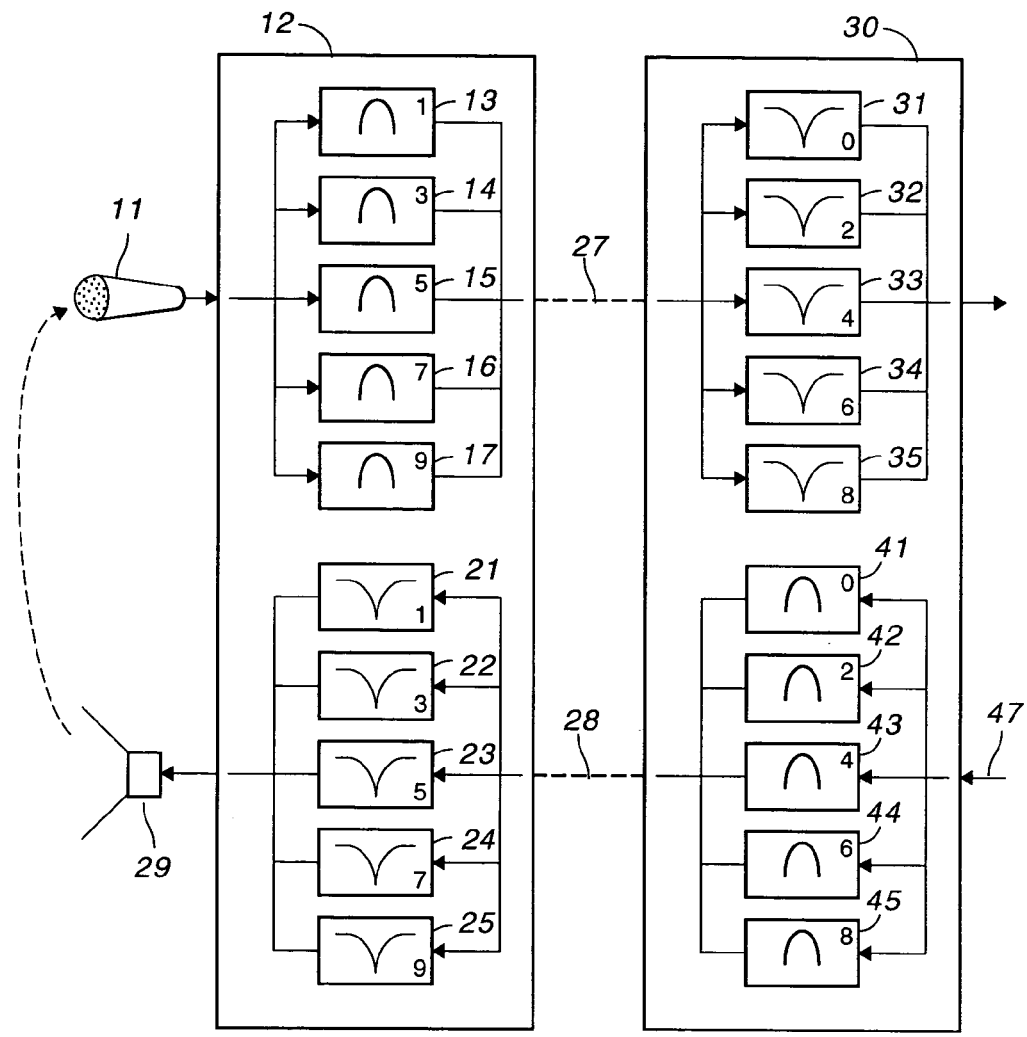
FIG. 1 is a block diagram of a comb filter constructed in accordance with the prior art.

In FIG. 1, sound incident upon microphone 11 is converted into an electrical signal and coupled to telephone 12. A portion of the circuitry within telephone 12 includes band pass filters 13, 14, 15, 16, and 17. For a bandwidth of 300–3,400 Hz, five filters are typical. More than five filters may result in too much overlap between bands.

Telephone 12 also includes notch filters 21, 22, 23, 24, and 25. The center frequencies of the notch filters correspond to the center frequencies of the band pass filters. Thus, a signal passing through the band pass filters, traveling along transmission line 27 and reflected back to transmission line 28 would be attenuated by the notch filters. A single telephone constructed in accordance with the invention provides approximately 10 dB of attenuation of a signal between microphone 11 and speaker 29.

Telephone 30 is constructed in like manner except that the center frequencies of the filters are offset from the center frequencies of the filters in telephone 12. Specifically, the center frequencies of notch filters 31, 32, 33, 34, and 35 are between the center frequencies of the band pass filters in telephone 12. Thus, the notch filters in telephone 30 are aligned with the dead bands between the band pass filters in telephone 12, which further increases the effectiveness of the circuit.

Telephone 30 also includes band pass filters 41, 42, 43, 44, and 45 having the same center frequencies as the notch filters in telephone 30. Thus, a signal on input 47, e.g., from a microphone (not shown), is divided among the band pass filters, summed, and transmitted over line 28 to telephone 12. The center frequencies of the notch filters in telephone 12 correspond to the dead bands between the bands of band pass filters 41–45, enhancing the operation of these filters.

Figure 2:
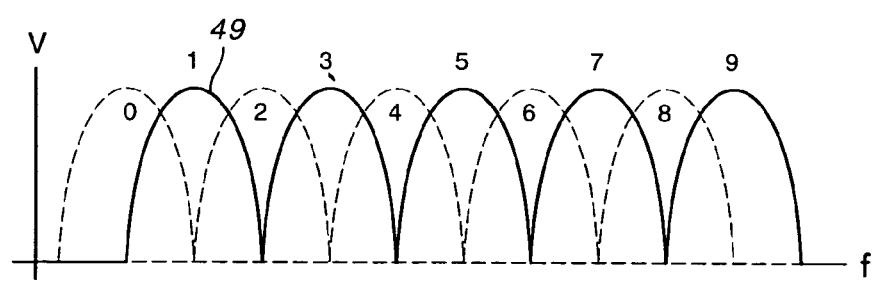
FIG. 2 is a chart illustrating the operation of the filters in FIG. 1.

The operation of telephones constructed in accordance with the invention is illustrated in FIG. 2. The center frequencies are numbered consistently with FIG. 1. In particular, curve 49 represents the frequency response of band pass filter 13 (FIG. 1). Filters 13 and 21 have the same center frequency, thereby reducing the amount of echoes or other noises between microphone 11 and speaker 29.

A problem with this construction is the need for an "A" telephone and a "B" telephone having complementary filter characteristics. In accordance with one aspect of the invention, this problem is eliminated by having a plurality of band pass filters in each channel and control circuitry for assigning the filters to each channel.

Figure 3:
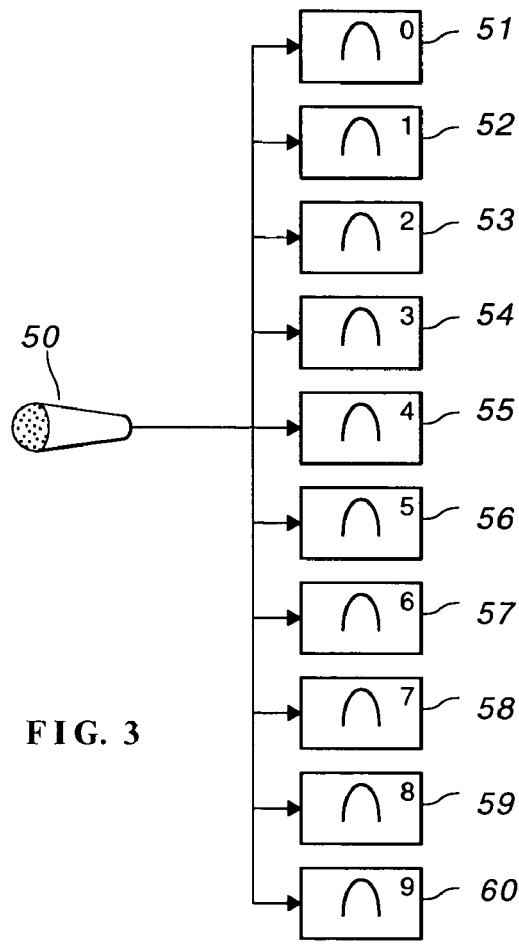
FIG. 3 is a block diagram of a filter system constructed in accordance with the invention.

FIG. 3 illustrates one channel of a telephone constructed in accordance with the invention. Microphone 50 is coupled to band pass filters 51, 52, 53, 54, 55, 56, 57, 58, 59, and 60. The band pass filters are preferably one-third octave filters and are preferably implemented as switched capacitor filters for ease in implementing as an integrated circuit. Any form of band pass filter can be used for the invention. A sub-set of these filters is chosen to provide full duplex operation.

Figure 4:
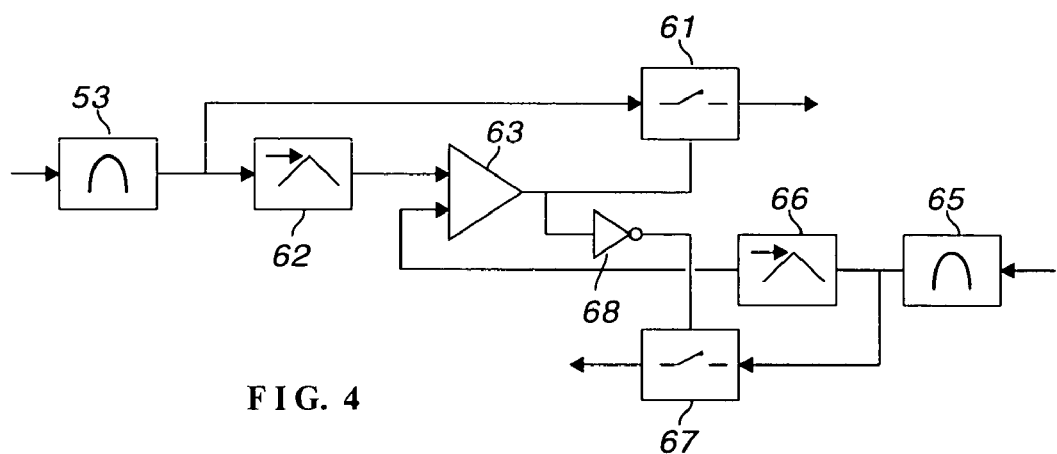
FIG. 4 is a schematic of circuitry for choosing which channel receives a particular filter.

FIG. 4 is a schematic of a circuit for choosing the louder of two channels within a given band. Filter 53 is coupled to switch 61 and to peak detector 62. When switch 61 is closed, the output signal from filter 53 is coupled to the line output (not shown) of the telephone. When switch 61 is open, the output signal from filter 53 is attenuated. Switches 61 and 67 are preferably in the form of a variable gain amplifier rather than a switching device. This not only provides greater flexibility in the circuit, it also avoids transients.

Filter 65, from a second channel, has substantially the same pass band as filter 53 and is coupled to peak detector 66 and to peak detector 66. The output from peak detector 62 is coupled to a first input of comparator 63. The output from peak detector 66 is coupled to a second input of comparator 63. The output from comparator 63 oppositely controls switches 61 and 67; that is, when switch 61 is closed, switch 67 is open and vice-versa. Thus, the louder signal in each channel prevails and is coupled to an output.

It is assumed that the signals in the two channels are comparable in power but differ in the spectral distribution of the power. If the signal in one channel is substantially greater than the signal in the other channel, all the filters might be assigned to the louder channel and operation would become half-duplex rather than full duplex. Additional logic (not shown) ran be used to prevent more than a certain number of adjacent filters from being set to a given channel. For example, one can provide that no more than two adjacent filters can be allocated to a given channel.

Figure 5:
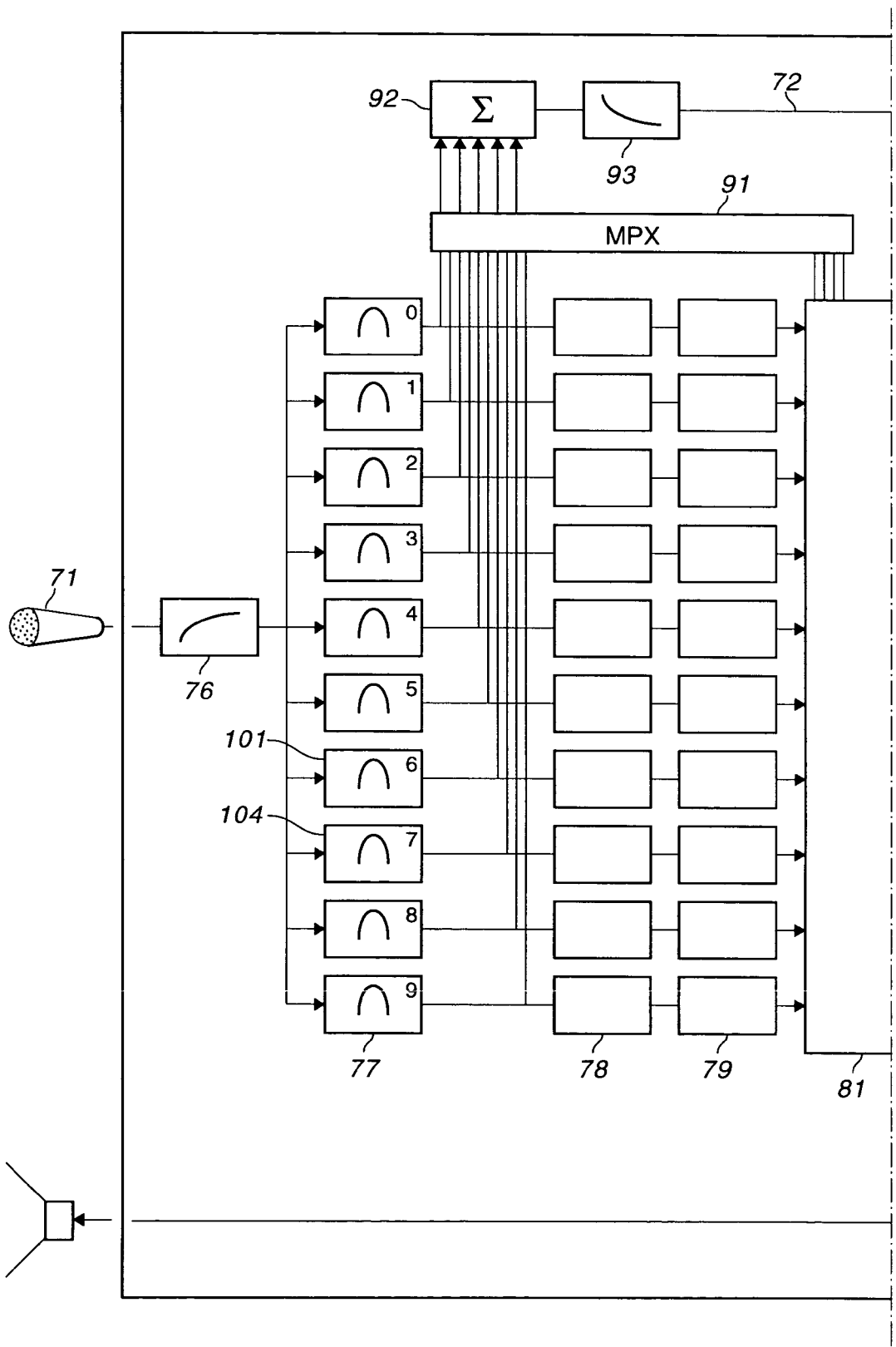
FIG. 5 is a block diagram of the microphone to line output channel in a telephone constructed in accordance with the invention.
Figure 6:
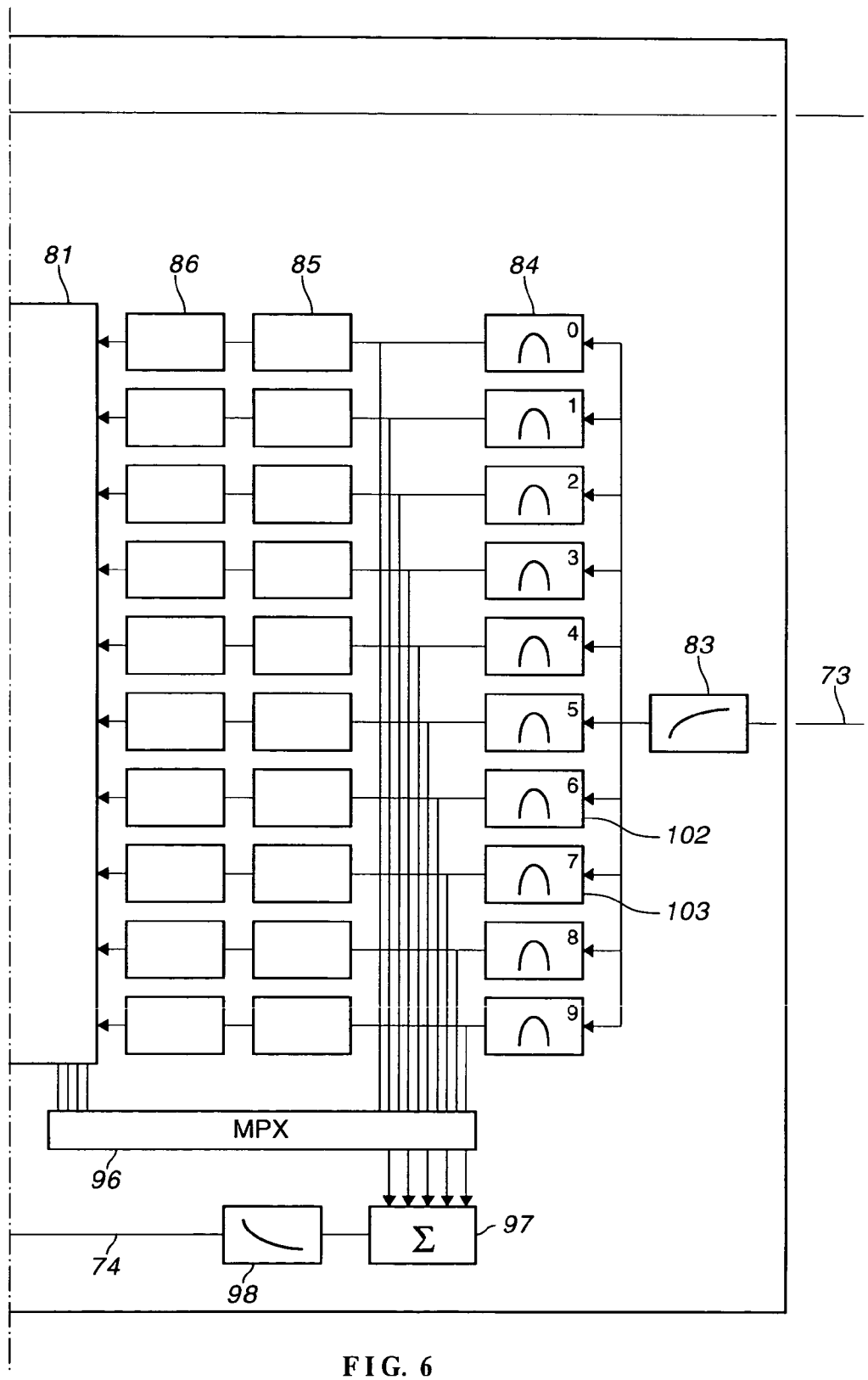
FIG. 6 is a block diagram of the line to speaker channel in a telephone constructed in accordance with the invention.

FIGS. 5 and 6 together illustrate a telephone constructed in accordance with a preferred embodiment of the invention. FIG. 5 is a block diagram of a first channel, extending from microphone 71 to line output 72, and FIG. 6 is a block diagram of a second channel, extending from line input 73 to speaker output 74.

Sound incident upon microphone 71 is converted into an electrical signal and coupled to weighting filter 76. Weighting filter 76 reduces the amplitude of low frequency signals to provide a more even energy distribution among the bands. Filter 76 can also be used to correct for non-linearities in the frequency response of microphone 71. The output from filter 76 is coupled to a first plurality of band pass filters, e.g. one-third octave filters. Much of the apparatus is duplicative and only one band is described.

Band pass filter 77 is coupled to filter 76 and to amplitude detector 78, which, for example, includes a rectifier and a low pass filter. More complex amplitude detectors can be used instead. The output from amplitude detector 78 is coupled to sample and hold circuit 79, which provides a stable signal for controller 81.

Weighting filter 83 (FIG. 6) receives signals from line input 73 and is coupled to a second plurality of band pass filters. Band pass filter 84 is coupled to filter 83 and to amplitude detector 85. The output from amplitude detector 85 is coupled to sample and hold circuit 86. Controller 81 receives the signals from all the sample and hold circuits and contains the logic for comparing the amplitudes of the signals in each band in each channel. The logic can be fixed or programmable.

In FIG. 5, controller 81 is coupled to the control inputs to multiplex circuit 91. Each band pass filter, such as filter 77, has an output coupled to a signal input of multiplex circuit 91, which has a plurality of signal output lines coupled to summation circuit 92. The output of summation circuit 92 is coupled to de-weighting filter 93, which as the inverse frequency response of filter 76. The output of de-weighting filter 93 is coupled to line output 72.

In FIG. 6, controller 81 is coupled to the control inputs to multiplex circuit 96. Each band pass filter, such as filter 84, has an output coupled to a signal input of multiplex circuit 96, which has a plurality of signal output lines coupled to summation circuit 97. The output of summation circuit 97 is coupled to de-weighting filter 98, which as the inverse frequency response of filter 83. The output of de-weighting filter 83 is coupled to speaker output 74.

With all the data flowing into controller 81, there are a number of combinations of filters that could be implemented in accordance with the invention. In one embodiment, the filters having substantially the same center frequency in each channel are paired and the output from only one filter in each pair is allowed. The loudest signal in a channel is found, then the loudest signal among the remaining filters in the other channel, and so on until all filters are allocated.

For example, filter 101 (FIG. 5) and filter 102 (FIG. 6) have substantially the same center frequency. If filter 101 produces the loudest signal in channel A, i.e. the microphone channel, then the output from filter 101 is coupled to summation circuit 92 by multiplex circuit 91. Controller 81 then looks for the loudest signal in channel B, the speaker channel, ignoring the output from filter 102. Assuming that this is the output from filter 103, the filter is coupled to summation circuit 97 by multiplex circuit 96 and the output from filter 104 is ignored. The process continues, ignoring previously allocated filters, until the ten bands are allocated between the two channels.

In a second embodiment of the invention, the loudest signal in either channel is found, then the next loudest in the same channel, and so on until five bands are allocated. As each band is allocated, the corresponding filter in the other channel is attenuated. After five bands are allocated, the remaining bands are attenuated in the channel that had the loudest signal. Thus, each channel is allocated five bands, i.e. half the number of bands in each channel.

In a third embodiment of the invention, the bands are allocated as in either of the first two embodiments with the additional requirement that no more than two filters in adjoining bands in a given channel are enabled simultaneously.

In a fourth embodiment of the invention, bands 1, 3, 5, 7, and 9 in one channel are compared with the corresponding bands in the other channel. The channel having the larger signal in the majority of the bands is assigned all the odd bands and the other channel is assigned all the even bands.

Other combinations may be better suited to a particular application. For one-third octave or smaller filters, the invention enables one to provide full duplex operation for three parties to a call, although there will be some noticeable signal degradation due to the reduction in spectral content. The logic for implementing the embodiments is well within the capabilities of one of ordinary skill in the art, whether fixed logic or programmable logic is used.

The allocation process is not time consuming and can easily be repeated every fifty milliseconds or so. In accordance with another aspect of the invention, controller 81 determines whether or not sounds are repetitive or relatively continuous and, therefore, not speech. In ordinary speech, the vocal chords are not used continuously; e.g. "z" is a vocal "s", "v" is a vocal "f". The letters "s" and "f" do not use the vocal chords but are fricatives, produced in the front of the mouth. Thus, a relatively continuous sound is likely to be noise rather than speech. Controller 81 attenuates the output from the particular filter producing the repetitive or continuous sound and removes the band from further analysis, thereby reducing noise. This can be easily done by adding more sample and hold circuits per filter or by logic within controller 81.

If additional sample and hold circuits were used, a number of sample and hold circuits are coupled to a given filter and updated at different times; e.g. at intervals of one quarter of a second. A signal having a duration greater than several sample times indicates a repetitive noise or a relatively constant sound.

If additional logic were used, the outputs from the sample and hold circuits are compared with a reference value to produce either a logic 1 or a logic 0, depending upon magnitude. The ten filters in each channel produce a ten bit word that is stored and compared with later obtained words, e.g. by performing a logic AND operation on the bits. Repetitive or relatively continuous noise would produce a logic 1 at the same bit location in each word, which would survive successive AND operations.

Other techniques can be used instead. The point is that, in accordance with the invention, relatively simple circuitry can perform sophisticated signal processing to improve the clarity and fidelity of speech in a difficult acoustic environment.

The invention thus provides an improved band pass filter system in which each band is chosen individually depending upon the spectral content of the applied signal. Full duplex communication is optimized for the voice characteristics of the respective speakers. A band pass filter system can emulate a comb filter initially and then adapt to the spectral content of each channel.

Having thus described the invention, it will be apparent to those of skill in the art that various modifications can be made within the scope of the invention. For example, although described in conjunction with a 2:1 multiplexer, other ratios can be used instead, e.g. 1:1 or 3:1. Multiplex circuit 91 includes variable gain amplifiers to attenuate, rather than switch, the outputs of some filters. Thus, a persistent sound in a band may be interpreted as noise but the output from the band pass filter is partially attenuated rather than blocked, thereby allowing some speech components to pass when they occur.

What is claimed as the invention is:

1. In an audio processing circuit including a plurality of band pass filters and a summation circuit for combining the outputs of the band pass filters, the improvement comprising:
   a multiplex circuit coupled between the band pass filters and the summation circuit; and
   control means coupled to the multiplex circuit for coupling a subset of said band pass filters to said summation circuit.

2. The audio processing circuit as set forth in claim 1 wherein said band pass filters have a pass band of one half octave or less.

3. A method for providing full duplex operation in a two channel audio system wherein each channel includes a plurality of band pass filters, said method comprising the steps of:
   applying a first signal to a first channel and a second input signal to a second channel;
   providing an indication of the magnitude of the signal in each band in each channel; and
   allocating the signals in the first channel to a first channel output and the signals in the second channel to a second channel output by:
   (a) finding the band having the largest signal;
   (b) coupling the signal to the channel output for that band and blocking the signal in the corresponding band in the other channel from the other channel output;
   (c) going to the other channel;
   (d) repeating steps (a), (b), and (c) for each next largest signal from the remaining bands.

4. A method for providing full duplex operation in a two channel audio system wherein each channel includes a plurality of band pass filters, said method comprising the steps of:
   applying a first input signal to a first channel and a second input signal to a second channel;
   providing an indication of the magnitude of the signal in each band in each channel; and
   allocating the signals the first channel to a first channel output and the signals in the second channel to a second channel output by:
   finding the band with the largest signal;
   coupling the signal from that band and from alternate bands in the same channel to the channel output for those bands;
   blocking the corresponding bands in the other channel from the channel output for those bands; and
   coupling the remaining bands in the other channel to the channel output for those bands.

5. A method for providing full duplex operation in a two channel audio system wherein each channel includes a plurality of band pass filters, said method comprising the steps of:
   applying a first input signal to a first channel and a second input signal to a second channel;
   providing an indication of the magnitude of the signal in each band in each channel; and
   allocating the signals in the first channel to a first channel output and the signals in the second channel to a second channel output by:
   determining the duration of a signal exceeding a threshold; and not allocating the signal if the duration of the signal exceeds a predetermined period.

6. In a telephone having a first channel including a microphone and a line output and a second channel including a line input and a speaker output, wherein each channel includes a plurality of band pass filters, the improvement comprising:
- a first multiplex circuit in the first channel for coupling at least some of said band pass filters to said line output;
- a second multiplex circuit in the second channel for coupling at least some of said band pass filters to said speaker output; and
- a controller coupled to said first multiplex circuit and said second multiplex circuit for initially coupling complementary subsets of filters to the respective outputs.

7. The telephone as set forth in claim 6 wherein said controller includes an amplitude detector for each band and controls said first multiplex circuit and said second multiplex circuit in accordance with the amplitudes of the signals in each band.

8. The telephone as set forth in claim 7 wherein said controller compares the magnitude of the signal in each hand in the first channel with the magnitude of the signal in a corresponding band in the second channel and directs the multiplex circuit to couple the signal with the greater magnitude to the output for the channel.

9. A method for processing an electrical signal, said method comprising the steps of:
- applying the electrical signal to a plurality of band pass filters to produce a plurality of filtered output signals;
- providing an indication of the duration of each filtered output signal; and
- attenuating a filtered output signal if the duration of the filtered output signal exceeds a predetermined period.

10. The method as set forth in claim 9,
- wherein the providing step includes the step of providing an indication of the magnitude of each filtered output signal and
- wherein the attenuating step includes attenuating a filtered output signal if the magnitude of the filtered output signal exceeds a predetermined amount and the duration of the filtered output signal exceeds a predetermined period.

* * * * *